R. LA ROSA

COMPACT PUMP SIGNAL SUPPLY CIRCUIT FOR TRAVELING-WAVE PARAMETRIC AMPLIFIERS

Filed Feb. 1, 1961

United States Patent Office 3,215,942

Patented Nov. 2, 1965

3,215,942

COMPACT PUMP SIGNAL SUPPLY CIRCUIT FOR TRAVELING-WAVE PARAMETRIC AMPLIFIERS

Richard La Rosa, South Hempstead, N.Y., assignor to Hazeltine Research, Inc., a corporation of Illinois Filed Feb. 1, 1961, Ser. No. 86,419
2 Claims. (Cl. 330—4.6)

Figure 1:
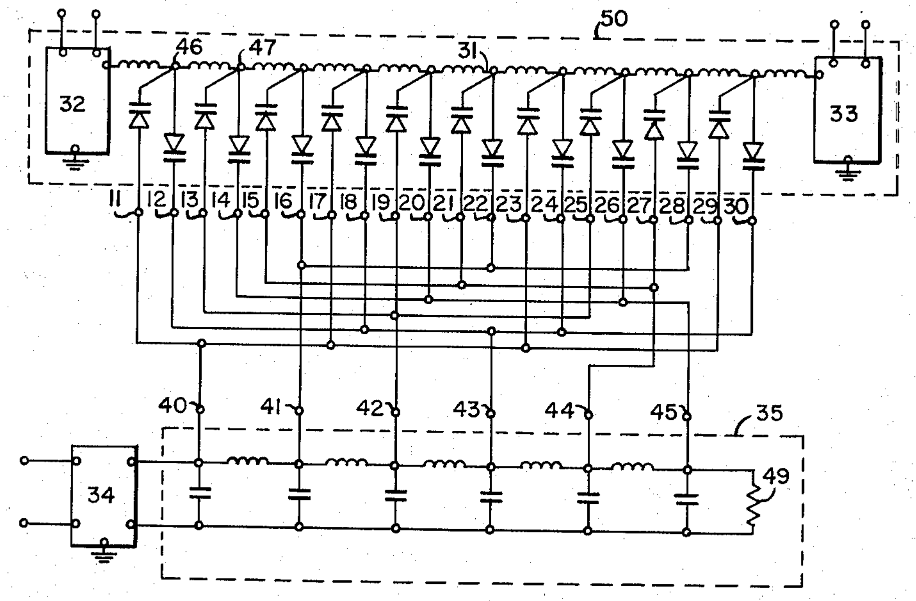

This invention relates to an improved pump signal supply circuit having special applicability to traveling-wave parametric amplifiers.

In many known types of traveling-wave parametric amplifiers it is necessary that the pump signals utilized to pump individual parametric amplification elements (for example, variable capacitance diodes) must be supplied to the individual elements with accurate phase relationships. The required result can be considered as requiring the pump signal energy supplied to each successive amplification element along the length of the amplification path to be supplied with proper relative phase shifts or delays between successive elements. (The terms "phase shift" and "phase delay" are used interchangeably in this specification.) In many instances, the apparent delays between the first and the last amplification elements are required to be several periods of the pump frequency and this has required a delay network capable of delaying pump frequency signals several periods. Delay networks for supplying these relatively long delays add substantial cost, size and complexity to such parametric amplifiers.

It is an object of this invention, therefore, to provide an improved pump signal supply circuit which avoids one or more of the disadvantages of the prior art arrangements.

It is a further object of this invention to provide a pump signal supply circuit for traveling-wave parametric amplifiers which allows signals with any desired degree of phase shift to be supplied from a phase shift network having a total phase shift of not more than one period of the pump frequency.

In accordance with the invention a pump signal supply circuit for a traveling-wave parametric amplifier requiring pump signal feeds with apparent phase differences which exceed one period of the pump frequency, comprises a source of pump frequency signals, a delay line for pump signals capable of producing a total phase delay of not more than one said period coupled to the source and having a plurality of output taps for feeding pump energy to each amplification element of a traveling-wave parametric amplifier at the correct phase required for each particular element, the pump signals with apparent phase differences which exceed one said period being supplied by pump signals at corresponding phases not exceeding one period; and pump signal termination means coupled to the delay line.

For a better understanding of the present invention, together with other and further objects thereof, reference is had to the following description taken in connection with the acocmpanying drawings, and its scope will be pointed out in the appended claims.

Figure 2:
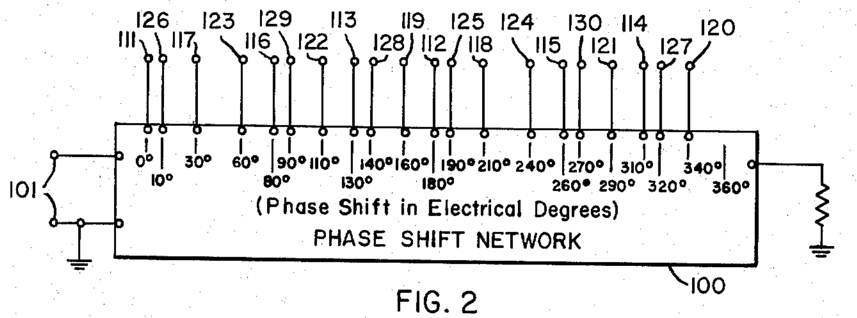
Figure 3:
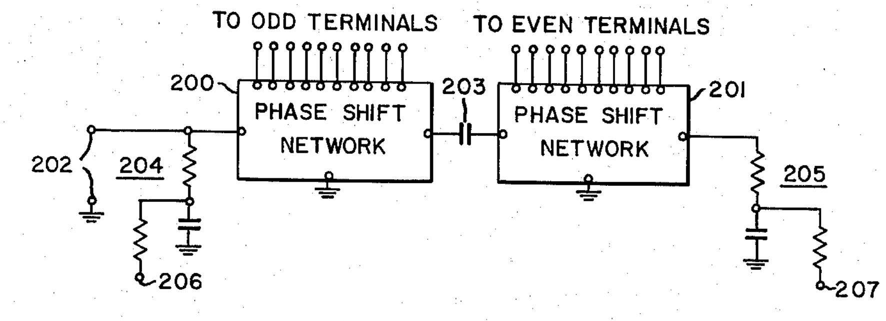

In the drawing:

FIG. 1 is a circuit diagram, partly schematic, of a complete traveling-wave parametric amplifier including a pump signal supply circuit embodying the present invention, and FIGS. 2 and 3 are schematic representations of additional configurations of pump signal supply circuits in accordance with the invention.

In many practical traveling-wave parametric amplifier designs the pump signal phase shaft between successive amplification elements can be made an exact submultiple of the pump frequency period. In this way a small number of taps along a delay line not more than 360° long (all references to degrees in this specification are intended to indicate electrical degrees) would be sufficient to supply all the elements in an amplifier. In the convenient case of 120° phase shift per element, all the elements could be supplied from a delay line having only six taps. Such an arrangement is shown in FIG. 1.

Referring to FIG. 1 there is shown a traveling-wave parametric amplifier comprising an arrangement of parametric amplifier elements shown as variable capacitance diodes, each having one end connected to one of terminals 11–30, inclusive. The other ends of these elements are connected to path 31, which is shown as simply consisting of lumped inductances, but which is intended to represent the transmission path along which signals travel while being amplified in a parametric amplifier according to prior art. The amplification elements are coupled in push-pull arrangement, each pair of adjacent diodes having a common terminal connecting to the transmission path 31. The parametric amplifier also includes arrangements shown as boxes 32 and 33 for processing idler frequency signals and input signals before and after amplification. The circuits, as described so far, are in accordance with well known principles of the prior art.

The amplifier also includes a source of pump frequency signals shown as source 34 which may be of any desired design applicable to the supply of the required signals. The amplifier further includes a phase shift network, shown as a delay line 35, and a plurality of tap means coupled to the delay line, shown as terminals 40–45, inclusive, which are coupled to the delay line at various points along its length.

Referring now to the operation of the FIG. 1 arrangement. This parametric amplifier is of such design that the phase shift in pump frequency signals required between adjacent amplification element connections (for example, connections 46 and 47) to the amplification path 31 are equal to 120° with relation to the pump frequency. In operation, pump signals of the proper frequency are supplied by source 34 to the delay line 35 which is shown as a simple lumped constant line well known in the prior art, and including terminating resistor 49. This line is designed so that the phase delay between adjacent output taps is 60° and the complete delay line has a total delay capability of only 300° at the pump frequency. Considering only the amplification elements which connect to odd ones of the terminals 11–30, inclusive, the total apparent phase difference required between elements related to terminal 11 and that related to terminal 29 is three full periods of the pump frequency. However, it will be seen that if we assume energy is supplied to the element connected to terminal 11 at reference or zero degrees phase delay, the energy supplied to terminal 13 will be required to have 120° delay; that supplied to terminal 15 will require 240° delay; that supplied to terminal 17 will require 360° delay; etc. But, energy with zero delay and energy with 360° of apparent phase delay have identical characteristics and zero phase delay may be said to correspond to 360° phase delay. Energy is, therefore, supplied to both terminals 11 and 17 from terminal 40, which is the reference or zero phase delay tap on the delay line 35. The diode pairs, as already mentioned, are in push-pull arrangement. This requires that alternate diodes of the push-pull pairs be supplied with pump energy having a relative phase difference of 180°. All the elements coupled to even ones of the terminals 11–30, inclusive, therefore, only require pump energy to be supplied with phase delays of 60°, 180°, or 300°. This follows since the diode coupled to terminal 12 requires energy having a phase shift of 180° (which is 180° out of phase with the zero phase delay energy supplied to terminal 11);

the energy supplied to terminal 14 is required to be at a phase shift of 300°; the energy supplied to terminal 16 is required to have a phase delay of 420° which corresponds to 60°; etc. Thus, the six taps of the delay line 35, feed pump energy to each amplification element of the amplifier at the correct phase required for each particular element, the pump signals with apparent phase differences which exceed the total phase shift of the delay line being supplied by pump signals at corresponding phases falling within the range of the total phase delay available.

Referring now to FIG. 2 there is illustrated a different configuration of a pump signal supply circuit in accordance with the invention. Assuming that we have a parametric amplifier including the arrangement enclosed in box 50 of FIG. 1, but that the design is such that the pump phase shift required between adjacent connections to the path 31 is 130° (instead of 120° as in FIG. 1), a slightly more complicated phase shift network in accordance with the invention can be used to supply this amplifier. In FIG. 2 phase shift network 100 has coupled thereto a source of pump frequency signals shown as comprising terminals 101, and a plurality of taps 111 through 130, inclusive. Each of these taps is effective to supply pump frequency energy with a relative phase delay as indicated by the phase shifts stated in degrees inside the box 100 adjacent to respective ones of these taps. The total phase shift of this network is less than one period at the pump frequency. The highest delay required is 340°, the 360° indication being included merely to show one full period. By analysis similar to that used in describing the FIG. 1 arrangement, it can readily be seen that if the diode coupled to terminal 11 operates at zero or reference phase shift, the other diode of this push-pull pair coupled to terminal 12 will require energy of 180° phase shift; energy supplied to terminal 13 will require 130° phase shift; terminal 14, 310° phase shift; terminal 15, 260° phase shift; terminal 16, 440° phase shift (which corresponds to 80°); etc. A complete analysis would show that energy with the phase shifts required at each of the terminals 11–30, inclusive, are properly provided by the taps of FIG. 2 having identifying numbers with corresponding units and ten digits (i.e. 111 supplies terminal 11, tap 124 supplies terminal 24, etc.). Thus, the invention is applicable to amplifiers which require pump signal phase delay between adjacent element pairs of other than a convenient submultiple of the pump period as was shown in FIG. 1.

Referring now to FIG. 3 there are shown two phase shift networks 200 and 201 which may be similar to the phase shift network 100 described with reference to FIG. 2. The arrangement of FIG. 3 is applicable to the case where external biasing is required to be applied to the amplification elements and the particular arrangement shown is specifically directed to the case where all push-pull diode pairs are required to have identical biasing. These networks are arranged so that pump frequency signals supplied to input terminals 202 are supplied to the phase shift networks 200 and 201 in tanden. As indicated, phase shift network 200 may be used to supply pump frequency signals of proper phase to all odd terminals of an arrangement of amplification elements similar to that included in box 50 of FIG. 1, and network 201 supplies energy to the proper phase to all of the even terminals. By including the D.-C. decoupling capacitor 203 between the two phase shift networks, it is possible to supply D.-C. biases independently to the two distinct groups of amplification elements by the application of proper potentials to the circuits 204 and 205 (each of which may include two resistors and a capacitor as shown) via terminals 206 and 207. Thus, the FIG. 3 arrangement allows desired biasing of the amplification elements.

Th described embodiments of the invention use a short, single ended (not push-pull) pump structure. This type of pump signal supply has several advantages including the following. First, essentially half the pump power is required as compared to a push-pull arrangement because a given potential variation is required to be applied to only one terminating resistor rather than two. Second, no push-pull pump signal input transformer is required. Third, a smaller size is allowed, which is a definite advantage in today's attempts at miniaturization. Fourth, it is easier to supply substantially equal magnitude pump signals to all the amplification elements with a short line than it is with a longer structure wherein greater attenuation in pump signals occurs as the signals travel along the length of the structure. Even in view of these advantages, it may sometimes be desirable to use a phase delay network having a delay capability in excess of one period of the pump period. Thus, particular circumstances might make desirable a delay capability of say two full periods in feeding an amplifier which requires a total apparent phase delay of say three full periods. Such a pump signal supply circuit can be constructed in accordance with this invention.

In traveling-wave parametric amplifiers designed for use at high frequencies, it is necessary to have all the pump signal tap means close to the amplification elements, or else to account for the phase shift of the pump signals in the transmission lines between the pump signal tap points and the individual amplification elements. Even if compensation is to be made for the delay in such coupling lines, for example by the inclusion of compensating networks, it is desirable to avoid crossing the lines in order to avoid spurious intercoupling between the various phases of the pump energy. In order to avoid these problems the present invention allows an amplifier to be designed with the amplification elements arranged in a circular fashion with a pump signal supply circuit at the center of the arrangement. In this way the transmission lines coupling the pump signal output taps to the individual amplification elements can be arranged to resemble radial spokes of substantially equal length radiating from a central pump supply circuit out to the amplification elements. In some cases it may be advantageous to arrange the amplifier so that the succession of amplification elements are placed in serpentine fashion like a repetitive S curve formed into a cylindrical surface, so that all elements are equidistant from a centrally located pump supply circuit lying along the cylinder axis and the repetition rate of the serpentine form corresponds to repetitive connections to the pump signal supply circuit.

It should be understood that loading of the pump supply circuit caused by connection to the signal circuits is compensated for in the design of the pump signal supply circuit. Also, if desired, D.-C. isolation can be provided for each individual amplification element, as by placing a D.-C. blocking capacitance in the path of each diode before connection to the pump supply circuit.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A pump signal supply circuit for a traveling-wave parametric amplifier requiring pump signal feeds with apparent phase differences which exceed one period of the pump frequency comprising: a source of pump frequency signals; a delay line for pump signals capable of producing a total phase delay of not more than one said period coupled to said source and having a plurality of output taps for feeding pump energy to each amplification element of a traveling-wave parametric amplifier at the correct phase required for each particular element, the pump signals with apparent phase differences which exceed one said period being supplied by pump signals at corresponding phases not exceeding one period; and pump signal termination means coupled to said delay line.

2. A traveling-wave parametric amplifier comprising: an arrangement of parametric amplifier elements which, in operation, require pump signals with apparent phase differences which exceed one period of the pump frequency; a source of pump frequency signals; a phase shift network capable of producing a total phase shift of not more than one said period coupled to said source; a plurality of tap means coupled to said network for feeding pump energy to each amplification element of the amplifier at the correct phase required for each particular element, the pump signals with apparent phase differences which exceed one said period being supplied by pump signals at corresponding phases falling within one period; and pump signal termination means coupled to said network.

References Cited by the Examiner

UNITED STATES PATENTS

| | | | |
|---|---|---|---|
| 3,012,203 | 12/61 | Tien | 330—5 |
| 3,016,492 | 1/62 | Landauer | 330—5 |
| 3,076,149 | 1/63 | Knechtli et al. | 330—4.6 |
| 3,096,485 | 7/63 | Chang | 330—4.6 |

ROY LAKE, *Primary Examiner.*

ELI J. SAX, *Examiner.*